US 9,506,465 B2

(12) United States Patent
Dybing et al.

(10) Patent No.: US 9,506,465 B2
(45) Date of Patent: Nov. 29, 2016

(54) AUTOMATIC OIL SPILL DETECTION SYSTEM

(71) Applicant: Eaton Corporation, Cleveland, OH (US)

(72) Inventors: Philip James Dybing, Canton, MN (US); Andrew Justin DeRung, Richfield, MN (US)

(73) Assignee: Eaton Corporation, Cleveland, OH (US)

( * ) Notice: Subject to any disclaimer, the term of this patent is extended or adjusted under 35 U.S.C. 154(b) by 306 days.

(21) Appl. No.: 14/045,316

(22) Filed: Oct. 3, 2013

(65) Prior Publication Data

US 2014/0099212 A1    Apr. 10, 2014

Related U.S. Application Data

(60) Provisional application No. 61/710,523, filed on Oct. 5, 2012.

(51) Int. Cl.
*F04B 49/10* (2006.01)
*F04B 49/00* (2006.01)
(Continued)

(52) U.S. Cl.
CPC ............ *F04B 49/002* (2013.01); *B60T 11/323* (2013.01); *B66F 9/22* (2013.01); *B66F 17/003* (2013.01); *E02F 9/226* (2013.01); *E02F 9/2296* (2013.01); *E02F 9/268* (2013.01); *F15B 19/005* (2013.01); *F15B 20/005* (2013.01); *G01M 3/26* (2013.01); *F15B 2211/20538* (2013.01);
(Continued)

(58) Field of Classification Search
CPC .... F04B 49/002; F04B 49/10; B60T 11/323; B66F 9/22; B66F 17/003; E02F 9/226; E02F 9/2296; E02F 9/268; F15B 19/005; F15B 20/005; F15B 2211/00–2211/895; G01M 3/26

See application file for complete search history.

(56) References Cited

U.S. PATENT DOCUMENTS

| 4,892,114 A | 1/1990 | Maroney et al. |
| 5,187,973 A | 2/1993 | Kunze et al. |

(Continued)

FOREIGN PATENT DOCUMENTS

| DE | 102 38 199 A1 | 3/2004 |
| WO | WO 2008/003352 A1 | 1/2008 |

OTHER PUBLICATIONS

International Search Report and Written Opinion for PCT/US2013/063215 mailed Feb. 20, 2014.

*Primary Examiner* — Peter J Bertheaud
*Assistant Examiner* — Dnyanesh Kasture
(74) *Attorney, Agent, or Firm* — Merchant & Gould P.C.

(57) ABSTRACT

A method for detecting and isolation a leak in a hydraulic system having a supply pump serving at least one control valve is disclosed. In one embodiment, the control valve has multiple work sections. In step of the method, the hydraulic system is activated. In another step, an actuation command for at least one of the work sections is received, for example from a human-to-machine interface. Subsequently, the method may include generating a flow demand for the work sections for which an actuation command has been received. The method also includes the step of implementing at least one of a first, second, third, and fourth leak detection and isolation protocol to detect and isolate a leak between the pump and the control valve assembly, a leak between the reservoir and the control valve assembly and a leak between the at least one work circuit and the control valve assembly.

20 Claims, 7 Drawing Sheets

(51) Int. Cl.
*B60T 11/32* (2006.01)
*F15B 19/00* (2006.01)
*F15B 20/00* (2006.01)
*G01M 3/26* (2006.01)
*E02F 9/22* (2006.01)
*E02F 9/26* (2006.01)
*B66F 9/22* (2006.01)
*B66F 17/00* (2006.01)

(52) U.S. Cl.
CPC ............... *F15B 2211/20546* (2013.01); *F15B 2211/41509* (2013.01); *F15B 2211/41563* (2013.01); *F15B 2211/426* (2013.01); *F15B 2211/634* (2013.01); *F15B 2211/6309* (2013.01); *F15B 2211/6313* (2013.01); *F15B 2211/6346* (2013.01); *F15B 2211/665* (2013.01); *F15B 2211/857* (2013.01); *F15B 2211/863* (2013.01); *F15B 2211/864* (2013.01); *F15B 2211/8633* (2013.01); *F15B 2211/8636* (2013.01); *F15B 2211/87* (2013.01); *F15B 2211/8752* (2013.01)

(56) References Cited

U.S. PATENT DOCUMENTS

| | | | |
|---|---|---|---|
| 5,272,646 A | 12/1993 | Farmer | |
| 5,497,653 A | 3/1996 | Snow | |
| 5,748,077 A * | 5/1998 | Brandt | B60T 11/323 340/450 |
| 6,470,247 B1 * | 10/2002 | Meyer | F15B 19/005 701/33.6 |
| 2005/0022589 A1 | 2/2005 | Du | |
| 2005/0234660 A1 | 10/2005 | Kambli et al. | |
| 2007/0028674 A1 * | 2/2007 | Beiderman | G01M 3/26 73/40.5 R |
| 2009/0242705 A1 | 10/2009 | Cros et al. | |
| 2010/0154400 A1 * | 6/2010 | Krajnik | E02F 9/2235 60/327 |

* cited by examiner

AUTOMATIC OIL SPILL DETECTION SYSTEM

RELATED APPLICATIONS

This application claims priority to U.S. Provisional Patent Application Ser. No. 61/710,523, filed on Oct. 5, 2012, the entirety of which is incorporated by reference herein.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a number of work circuits configured to carry out various functions of the work machine. For example, a work machine may have a work circuit for lifting and lowering a work implement and another work circuit for causing the work implement to rotate. The work circuits are typically powered by a hydraulic system including a hydraulic pump powered by a prime mover, such as a diesel engine. It is not uncommon for such a hydraulic system to develop a leak. Where a significant loss of hydraulic fluid is lost due to a leak, a complete loss of system functions can occur. Improvements are desired.

SUMMARY

A method for detecting and isolation a leak in a hydraulic system having a supply pump serving at least one control valve is disclosed. In one embodiment, the control valve has multiple work sections. In step of the method, the hydraulic system is activated. In another step, an actuation command for at least one of the work sections is received, for example from a human-to-machine interface. Subsequently, the method may include generating a flow demand for the work sections for which an actuation command has been received. The method also includes the step of implementing at least one of a first, second, third, and fourth leak detection protocol to detect and isolate a leak between the pump and the control valve assembly, a leak between the reservoir and the control valve assembly and a leak between the at least one work circuit and the control valve assembly.

The first leak detection and isolation protocol may include the steps of monitoring a measured pump supply pressure; comparing the measured pump supply pressure to a pump supply pressure lower limit; and generating a hydraulic system leak signal to close a main pump isolation valve and to set the pump to a zero flow state when the measured pump supply pressure falls below the pump supply pressure lower limit.

The second leak detection and isolation protocol may include the steps of monitoring a measured flow consumption at an input and an output port for each of the hydraulic work sections; correlating the input flow consumption to the output flow consumption to create a monitored flow consumption correlation; comparing the monitored flow consumption correlation to a flow consumption correlation limit; and generating a hydraulic system leak signal to set a zero flow demand signal to any work section having a monitored flow consumption correlation exceeding the flow consumption correlation limit for the work section.

The third leak detection isolation protocol may include the steps of setting one or more work sections to a zero flow state and recording a differential pressure between a measured inlet and a measured outlet pressure; monitoring the inlet and outlet pressure for each of the work sections and calculating a monitored differential pressure; comparing the difference between the recorded differential pressure and the monitored differential pressure to a differential pressure change limit value; and generating a hydraulic system leak signal to set a zero flow demand signal to each work section having a monitored differential pressure that exceeds the recorded differential pressure by more than the change limit value. The method may also include the step of locking out any new flow commands until the portion of the system for which a leak detection signal has been generated is reset.

The fourth leak detection isolation protocol may include, in part, the steps of detecting a leak between the reservoir and the control valve assembly, isolating the pump from the control valve assembly, setting the pump to a zero flow state, and generating a leak detection signal.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
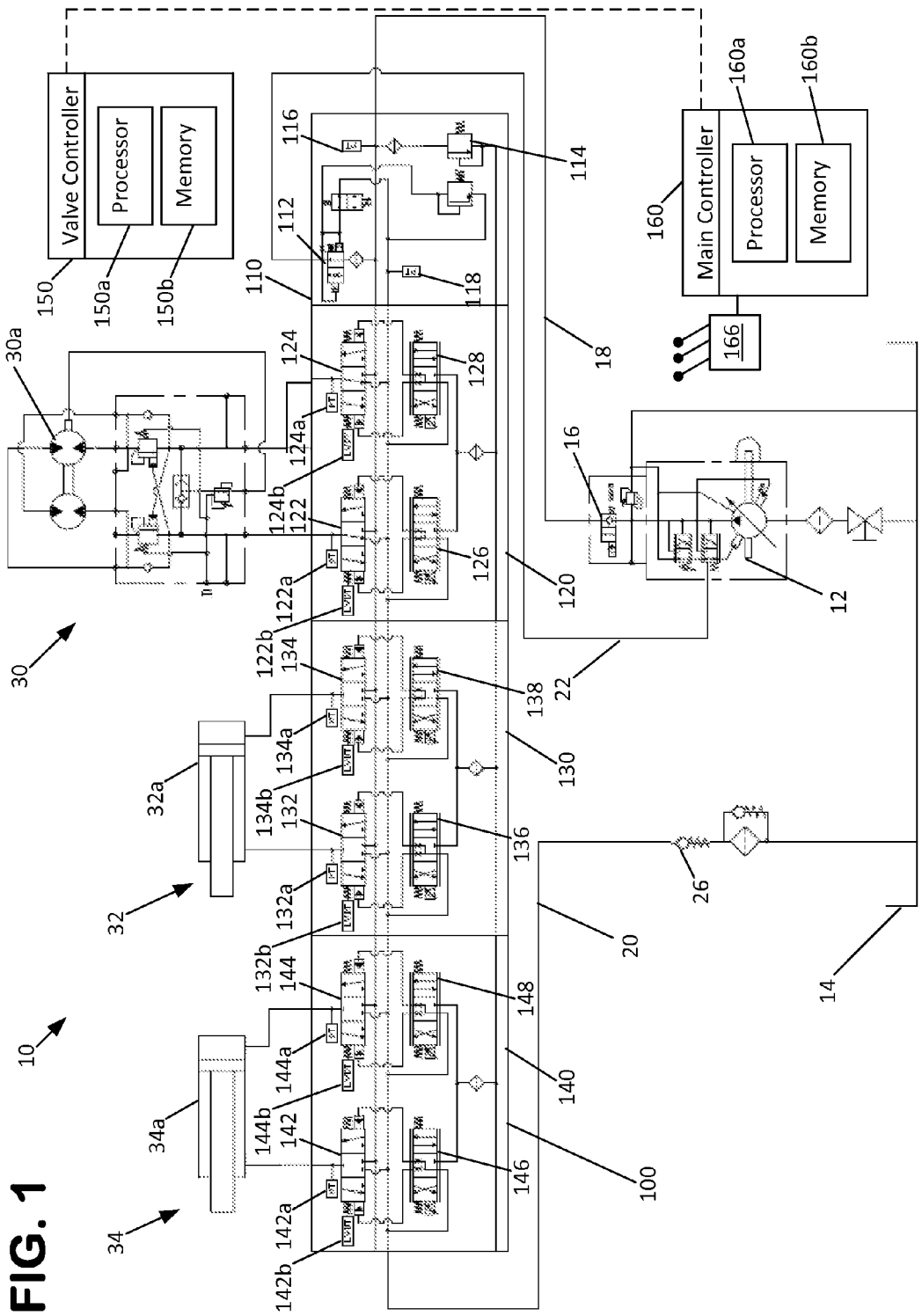
FIG. 1 is a schematic view of a first embodiment hydraulic system having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Hydraulic System Description

Referring to FIG. 1, a hydraulic system 10 is illustrated as a schematic diagram. Hydraulic system 10 may be part of a vehicle system, for example, a fork lift or a telehandler. As shown, hydraulic system 10 includes a pump 12 configured to provide pressurized fluid to at least one control valve assembly 100. In the embodiment shown, pump 12 is shown as a variable displacement axial pump with a primary shut off valve 16. However, other types of pumps may be used for pump 12, such as an over-center pump. As configured, the hydraulic pump 12 includes an inlet (i.e., a low pressure side) that receives hydraulic fluid from a reservoir 14, and the hydraulic pump 12 includes an outlet (i.e., a high pressure side) that is connected to the control valve assembly 100 via supply line 18. When the pump 12 is rotated, hydraulic fluid is drawn from the reservoir 14 into the inlet of the hydraulic pump 12 and expelled from the outlet of the hydraulic pump 12 at a higher pressure. Fluid is returned from the control valve assembly 100 by a reservoir line. In the embodiment shown, the output flow of the pump 12 is controlled by a load-sense line 22 extending from the control valve assembly 100. Fluid is returned to the reservoir 14 via return line 20 where a spring check valve 26 may be installed to maintain a nominal back pressure in the return line 20.

Still referring to FIG. 1, the control valve assembly 100 is shown as being a multi-section valve configured to provide selective operational control to a number of work circuits. As shown, control valve assembly 100 is a two-stage control valve assembly, such as an Ultronics® ZTS 16 Integrated Proportional Control Valve manufactured by Eaton Corporation of Cleveland, Ohio. An example of a twin spool valve is disclosed in U.S. Pat. No. 8,239,069 to Yuan et al., filed Jun. 11, 2009, which is incorporated herein by reference in its entirety. However, it is noted that other types of valves may be used without departing from the concepts presented herein. In the embodiment shown, control valve assembly includes three work sections 120, 130, 140 corresponding to three work circuits 30, 32, and 34. Although three work circuits are shown, more or fewer work circuits may be associated with control valve assembly 100. As shown, work circuit 30 includes a hydraulic motor system 30a, work circuit 32 includes a double acting hydraulic actuator 32a, and work circuit 34 includes a double acting hydraulic actuator 34a. It should be understood that other types of work circuits may be operated by control valve assembly 100.

As shown, the first work section 120 includes a first proportional valve 122 and a second proportional valve 124 configured to selectively control flow to and from the work circuit 30. The position of the first proportional valve 122 may be controlled by a first pilot valve 126 while the position of the second proportional valve 124 may be controlled by a second pilot valve 128, wherein the position of the first and second pilot valves 126, 128 may be controlled by an electronic signal from a valve controller 150 or a main controller 160 (discussed later). In the embodiment shown, pressure sensors 122a, 124a are provided at the outlets of the first and second proportional valves 122, 124, respectively. Position sensors 122b, 124b, which may be LVDT position sensors, are also shown as being provided for the first and second proportional valves 122, 124, respectively.

As shown, the second work section 130 includes a first proportional valve 132 and a second proportional valve 134 configured to selectively control flow to and from the work circuit 32. The position of the first proportional valve 132 may be controlled by a first pilot valve 136 while the position of the second proportional valve 134 may be controlled by a second pilot valve 138, wherein the position of the first and second pilot valves 136, 138 may be controlled by an electronic signal from a valve controller 150 or a main controller 160 (discussed later). In the embodiment shown, pressure sensors 132a, 134a are provided at the outlets of the first and second proportional valves 132, 134, respectively. Position sensors 132b, 134b, which may be LVDT position sensors, are also shown as being provided for the first and second proportional valves 132, 134, respectively.

As shown, the third work section 140 includes a first proportional valve 142 and a second proportional valve 144 configured to selectively control flow to and from the work circuit 34. The position of the first proportional valve 142 may be controlled by a first pilot valve 146 while the position of the second proportional valve 144 may be controlled by a second pilot valve 148, wherein the position of the first and second pilot valves 146, 148 may be controlled by an electronic signal from a valve controller 150 or a main controller 160 (discussed later). In the embodiment shown, pressure sensors 142a, 144a are provided at the outlets of the first and second proportional valves 142, 144, respectively. Position sensors 142b, 144b, which may be LVDT position sensors, are also shown as being provided for the first and second proportional valves 142, 144, respectively.

The control valve assembly 100 is also shown as having a valve control section 110. As shown, valve control section 110 is configured with a load-sense valve 112 that provides a load-sense signal to control the output of pump 12 via load-sense line 22 such that the pump output matches the flow requirements of the work circuits 30, 32, 34. Valve control section 110 is also provided with a pilot pressure reducing valve for reducing fluid pressure to an acceptable range for controlling the position of the proportional valves 122, 124, 122, 124, 132, 134. A supply pressure sensor 116 and a return pressure sensor 118 are also shown as being provided in valve control section 110.

Figure 2:
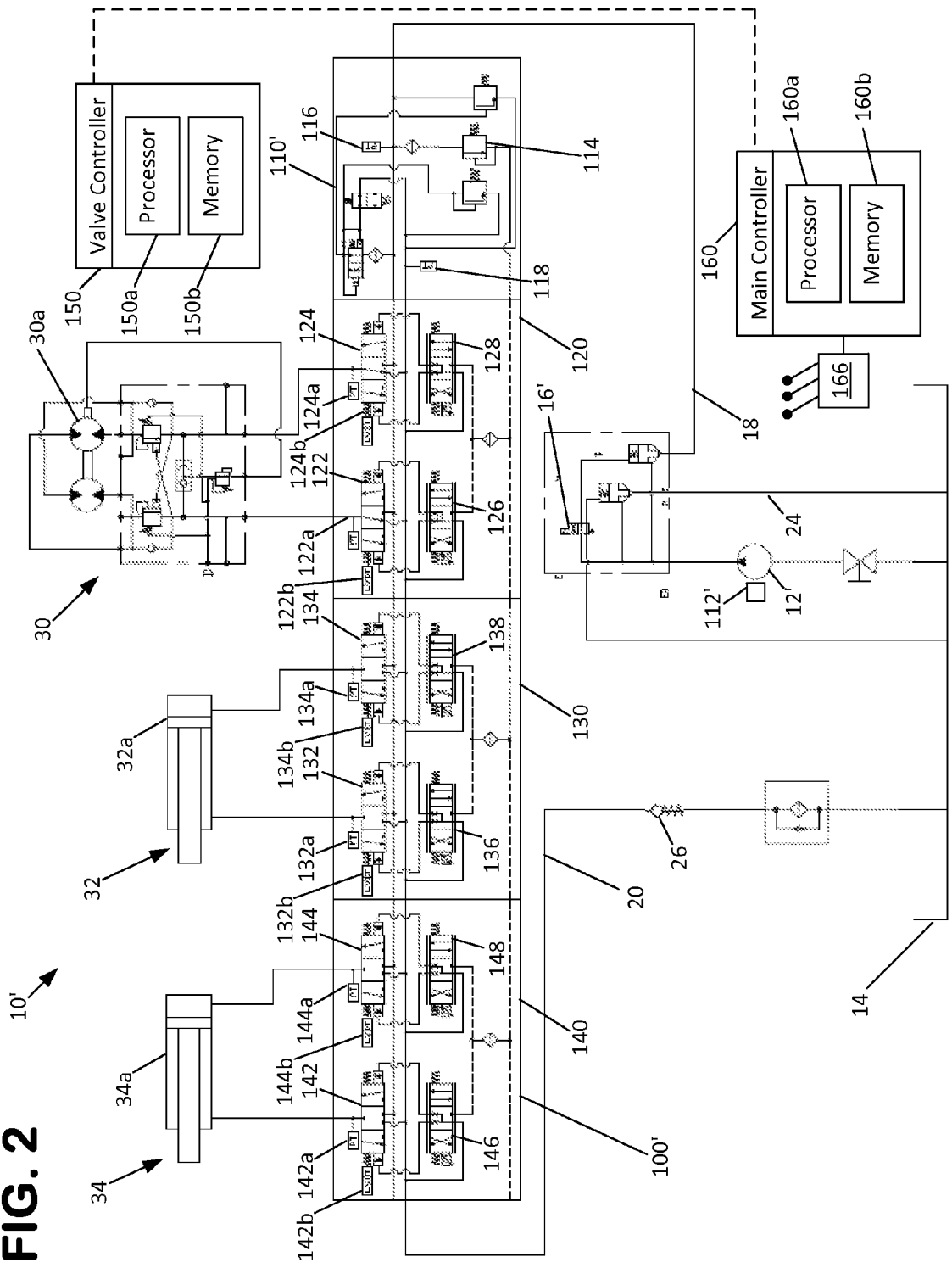
FIG. 2 is a schematic view of a second embodiment hydraulic system having features that are examples of aspects in accordance with the principles of the present disclosure.

Referring to FIG. 2, a second embodiment of a hydraulic system 10' involving a fixed displacement pump 12' is presented. As many of the concepts and features are similar to the first embodiment shown in FIG. 1, the description for the first embodiment is hereby incorporated by reference for the second embodiment. Where like or similar features or elements are shown, the same reference numbers will be used where possible. The following description for the second embodiment will be limited primarily to the differences between the first and second embodiments.

The hydraulic system 10' is shown as having a valve control assembly 100' with a valve control section 110'. The work sections 120, 130, 140 of the second embodiment are shown as being the same as the first embodiment. However, the valve control section 110' in the second embodiment does not include a load-sense valve. Instead a pump speed sensor 112' is utilized in conjunction with a bypass valve 16', in fluid communication with the reservoir 14 via line 24, to control the output flow of the pump 12'.

Electronic Control System

The hydraulic system 10 or 10' operates in various modes depending on demands placed on the work machine (e.g., by an operator). A control system may be provided to implement the operating modes of the hydraulic system 10, 10'. In the embodiment shown, a valve controller 150 and a main controller 160 are shown as being in electronic communication with each other and with the various control components in the system 10, 10'. However, it should be understood that a single controller could be used to execute the operation of the hydraulic system 10, 10' and also understood that a larger number of controllers may be used. Furthermore, it should also be understood that, where multiple control valve assemblies 100 are used in a system 10, 10' that a single main controller 160 may be provided in addition to a plurality of valve controller 150.

The electronic controllers 150, 160 are schematically shown as including a processor 150a, 160a and a non-transient storage medium or memory 150b, 160b such as RAM, flash drive or a hard drive. Memory 150b, 160b is for storing executable code, the operating parameters, and the input from the operator user interface while processor 150a, 160a is for executing the code. The electronic controller 150, 160 typically includes at least some form of memory 150b, 160b. Examples of memory 150b, 160b include computer readable media. Computer readable media includes any available media that can be accessed by the processor 150a, 160a. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 150A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Electronic controller 150 is also shown as having a number of inputs and outputs that may be used for implementing the operation of the hydraulic system 10, 10'. For example, controller 150 may be configured to receive inputs from the position sensors 122b, 124b, 132b, 134b, 142b, and 144b and inputs from the pressure sensors 122a, 124a, 132a, 134a, 142a, 144a, 116, and 118. The electronic controller 150 may also be configured to receive inputs from the main controller 160, such as flow demand signals for each of the work sections 120, 130, 140. The electronic controller 150 may also be configured to send outputs to a variety of components, such as the pilot control valves 126, 128, 136, 138, 146, 148, the load-sense valve 112, and the main controller 160. Controller 150 may also be configured to pass any operational data through to the main controller 160.

Electronic controller 160 is also shown as having a number of inputs and outputs that may be used for implementing the operation of the hydraulic system 10, 10'. For example, controller 160 may be configured to receive inputs from a human-to-machine interface 166 and to send outputs to main shut off valve 16, pump 12', bypass valve 16' The electronic controller 150 may also be configured to receive inputs from the main controller 160, such as flow demand signals for each of the work sections 120, 130, 140. The electronic controller 160 may also be configured to send outputs to the valve controller 150 and pass operational data through to the valve controller 150.

Method of Operation

Referring to FIGS. 3-7, a method 1000 of operating the hydraulic system 10 is shown. It is noted that although FIGS. 3-7 diagrammatically show the method steps in a particular order, the method is not necessarily intended to be limited to being performed in the shown order. Rather at least some of the shown steps may be performed in an overlapping manner, in a different order and/or simultaneously. Furthermore, it is noted that any or all of the steps disclosed in relation to method 1000 may be performed on controller 150 alone, controller 160 alone, apportioned between controllers 150 and 160, or apportioned among other additional controllers. Furthermore, it is noted that the method 1000 may be carried out over a number of hydraulic systems simultaneously and is not limited to being implemented only in configurations where there is a one to one relationship between a pump and a control valve assembly. Additional controllers may be used as well.

Figure 3:
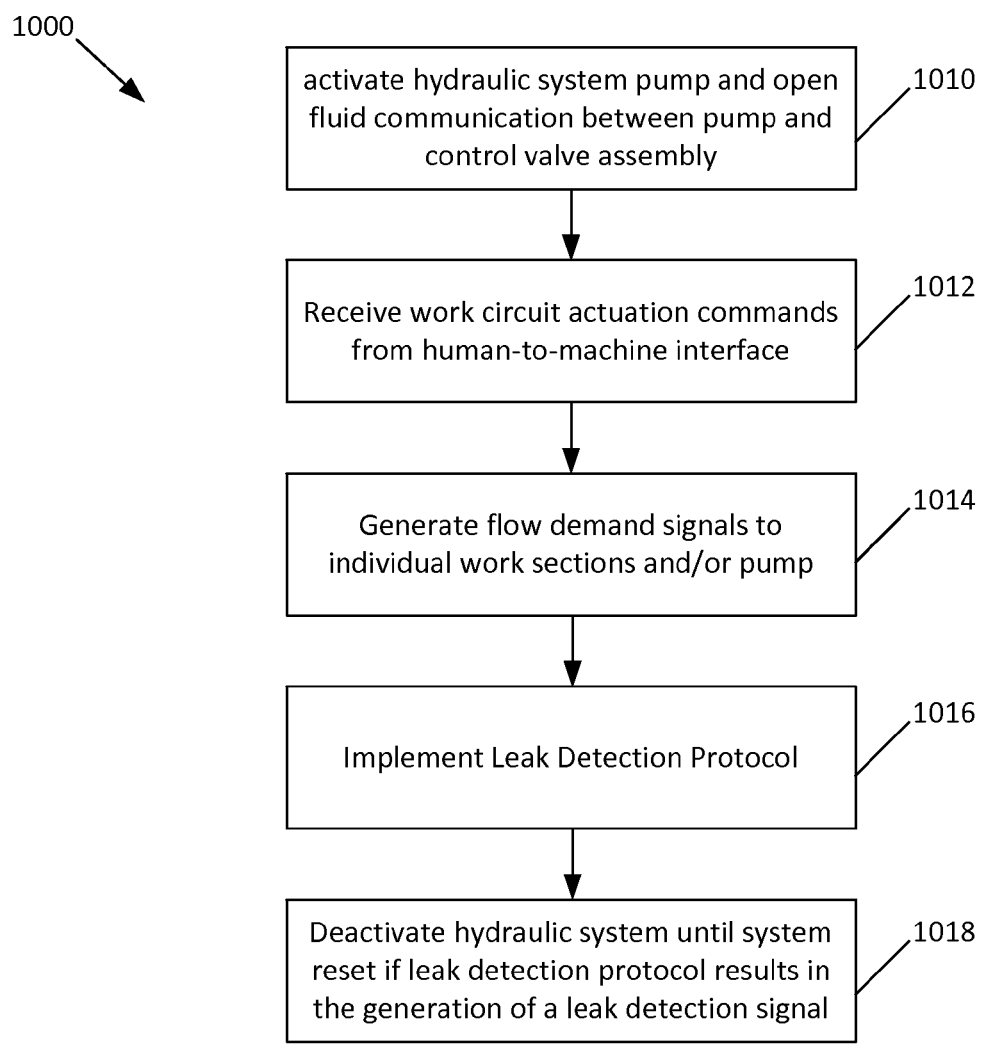
FIG. 3 is a process flow chart showing a method of operation of either of the hydraulic systems shown in FIGS. 1 and 2.

Referring to FIG. 3, a first step 1010 is shown as activating the hydraulic system pump and opening fluid communication between the pump and the control valve assembly. Where a main shut-off valve is provided between the pump and control valve assembly, this step may include opening the main shut-off valve. Where a bypass valve is provided between the pump and control valve assembly, this step may include positioning the bypass valve to direct fluid to the control valve assembly.

A second step 1012 is shown as receiving work circuit actuation commands from a human-to-machine interface, such as interface 166. This interface may be a combination of levers associated with the various work circuits, for example, lift, extend, side-shift, and tilt levers. In a step 1014, flow demand signals are generated to the pump and/or the individual work sections. In one embodiment, either of the valve controller and main controller can proportion the flow to the work sections where the sum of the total flow demand signals exceeds the capacity of the pump.

In a step 1016, a leak detection protocol is initiated. The leak detection protocol may include one or more of the leak detection protocols 1100, 1200, 1300, 1400 outlined in FIGS. 4-7, described below. In a step 1018, the hydraulic system is deactivated until system reset if the leak detection protocol step 1016 results in the generation of a leak detection signal. Step 1018 may include deactivating the entire hydraulic system, for example by commanding the pump to a zero flow state and isolating the pump from the control valve assembly. Step 1018 may also include deactivating only a portion of the hydraulic system, for example by commanding an individual work section to a zero flow state and isolating the associated work circuit from the rest of the hydraulic system.

Figure 4:
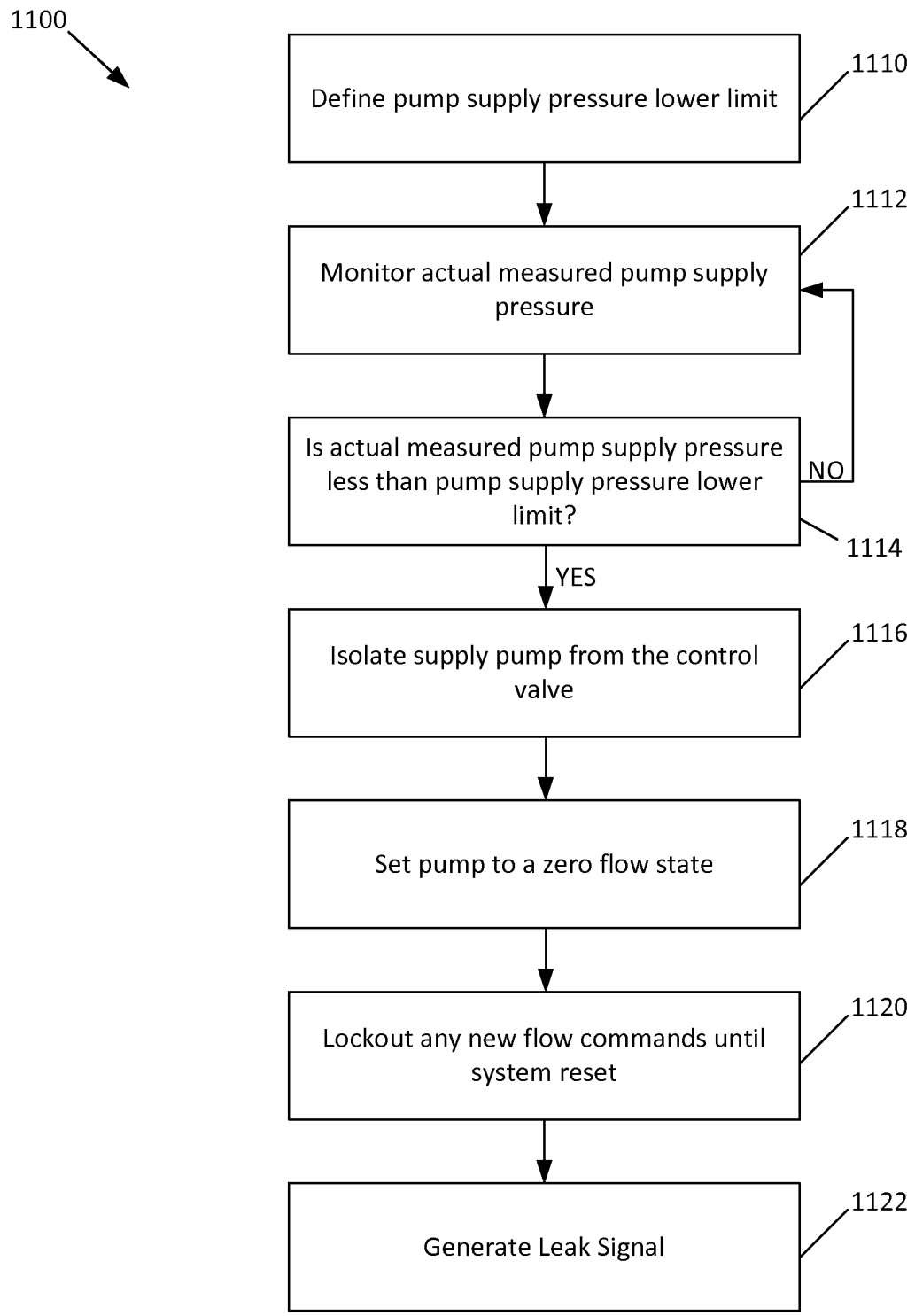
FIG. 4 is a process flow chart showing a first leak detection and isolation protocol for use in the process shown in FIG. 3.

Referring to FIG. 4, a first leak detection protocol 1100 is disclosed. First leak detection protocol 1100 is for detecting a leak in the hydraulic system between the pump and the control valve assembly. In a step 1110, a supply pressure lower limit is defined. In a step 1112, an actual measured pump supply pressure is monitored. In one embodiment, the pump supply pressure may be monitored at pressure sensor 116 via valve controller 150. In a step 1114, the actual measured pump supply pressure is compared to the pump supply pressure lower limit. If the measured value is equal to or above the lower limit, then the protocol 1100 returns to step 1112 for continued monitoring. If the measured value is below the lower limit, which would be indicative of a leak, for example in line 18, the protocol 1100 proceeds to step 1116 wherein the supply pump 12 is isolated from the control valve. Where a main shut-off valve is provided, such as valve 16 shown in FIG. 1, step 1116 can include closing the valve 16 to isolate the pump 12 from the control valve assembly 100. Where a bypass valve is provided, such as valve 16' shown in FIG. 2, step 1116 can include moving the bypass valve 16' to a bypass state where fluid from pump 12 is directed to reservoir 14 via line 24 and the fluid in the control valve assembly 100' is thereby isolated from the pump 12. In the embodiment shown, the command to valves 16, 16' is sent by the main controller 160 which receives the pressure data from sensor 116 via controller 150. In a step 1118, the pump is set to a zero flow state while in a step 1120 any new flow commands to the pump from controllers 150, 160 are locked out until a system reset has occurred. In a step 1122, a leak signal is generated. It is noted that steps 1116, 1118, 1120, and 1122 may be performed simultaneously by the controller(s) 150, 160, or in a sequential fashion.

Figure 5:
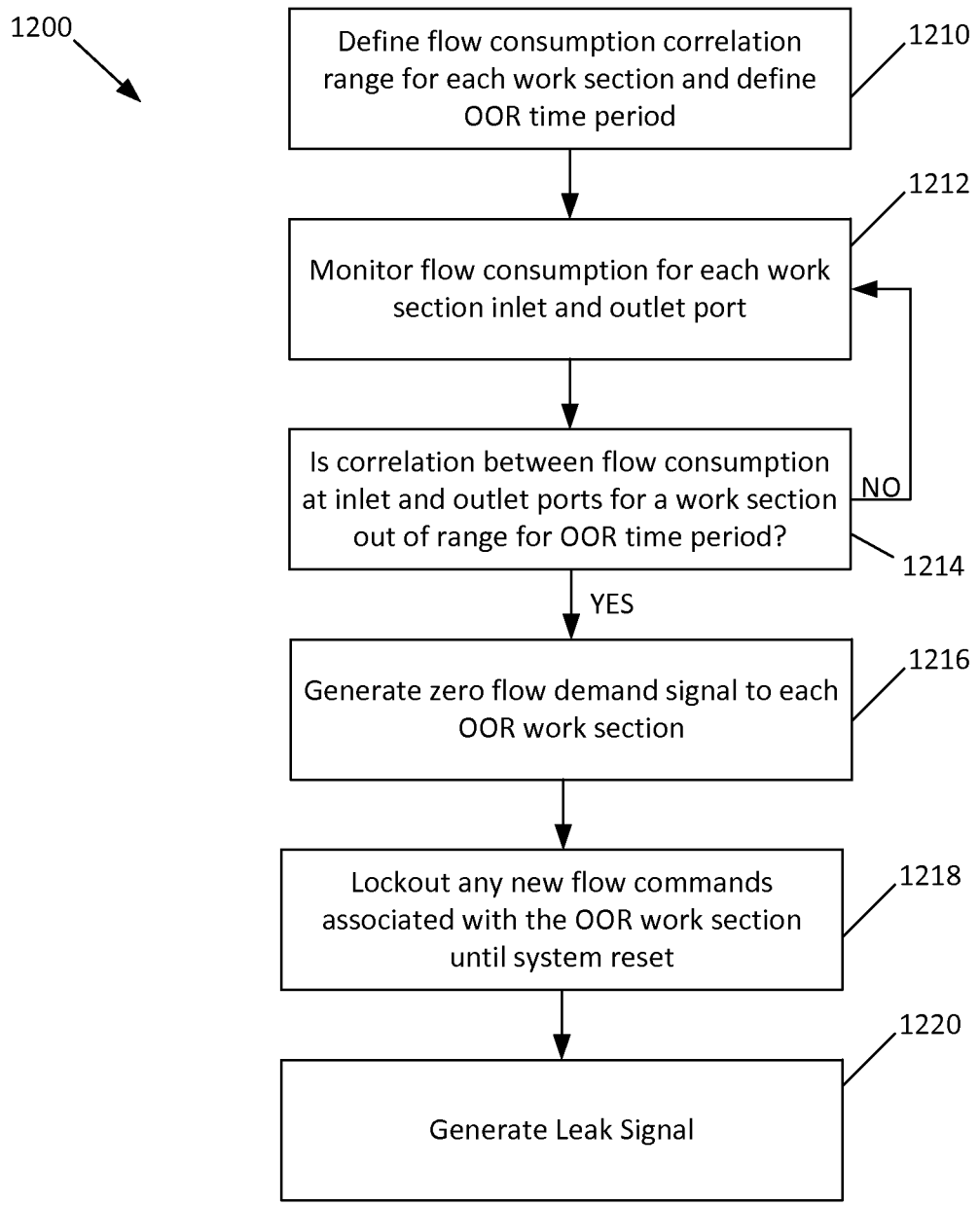
FIG. 5 is a process flow chart showing a second leak detection and isolation protocol for use in the process shown in FIG. 3.

Referring to FIG. 5, a second leak detection protocol 1200 is disclosed. Second leak detection protocol 1200 is for detecting a leak in the hydraulic system between the control valve assembly and one or more of the connected work circuits when the work circuit is in use. In a step 1210, a flow consumption correlation range for each work section is defined. Because an actuator or work circuit may have inlet and outlet flows that are not equal (e.g. because of different cylinder ratios and inefficiencies), a comparison between and actual correlation and a measured correlation between the two flows can be utilized to detect a leak. Step 1210 is also shown as defining an out of range (OOR) time period for establishing a minimum duration of a fault condition before a leak signal is generated. In step 1212, flow consumption for each work section inlet and outlet port is monitored. In the embodiment shown, controller 150 monitors pressure sensors 122a, 124a, 132a, 134a, 142a, and 144a for this purpose. In a step 1214 the measured correlation between associated inlet and outlet ports for each work section is compared to the flow consumption correlation range for that work section. Where the measured correlation is less than or equal to a predetermined correlation range or margin, the protocol 1200 returns to step 1212. Where the measured correlation is more than the predetermined correlation range or margin, which would be indicative of a leak in the work circuit, the protocol 1200 proceeds to step 1218. In step 1218, the out of range work section is set to a zero flow condition and locked out from receiving any new flow commands until system reset while step 1120 includes the generation of a leak detection signal. Unlike leak detection protocol 1100, protocol 1200 allows the hydraulic system to at least be partially operative by isolating only those work sections for which a leak is detected. Accordingly, protocol 1200 will continually monitor all active work sections even if a leak signal has been generated for one or more of the other work sections. It is noted that steps 1216, 1218, and 1220 may be performed simultaneously by the controller(s) 150, 160, or in a sequential fashion.

Figure 6:
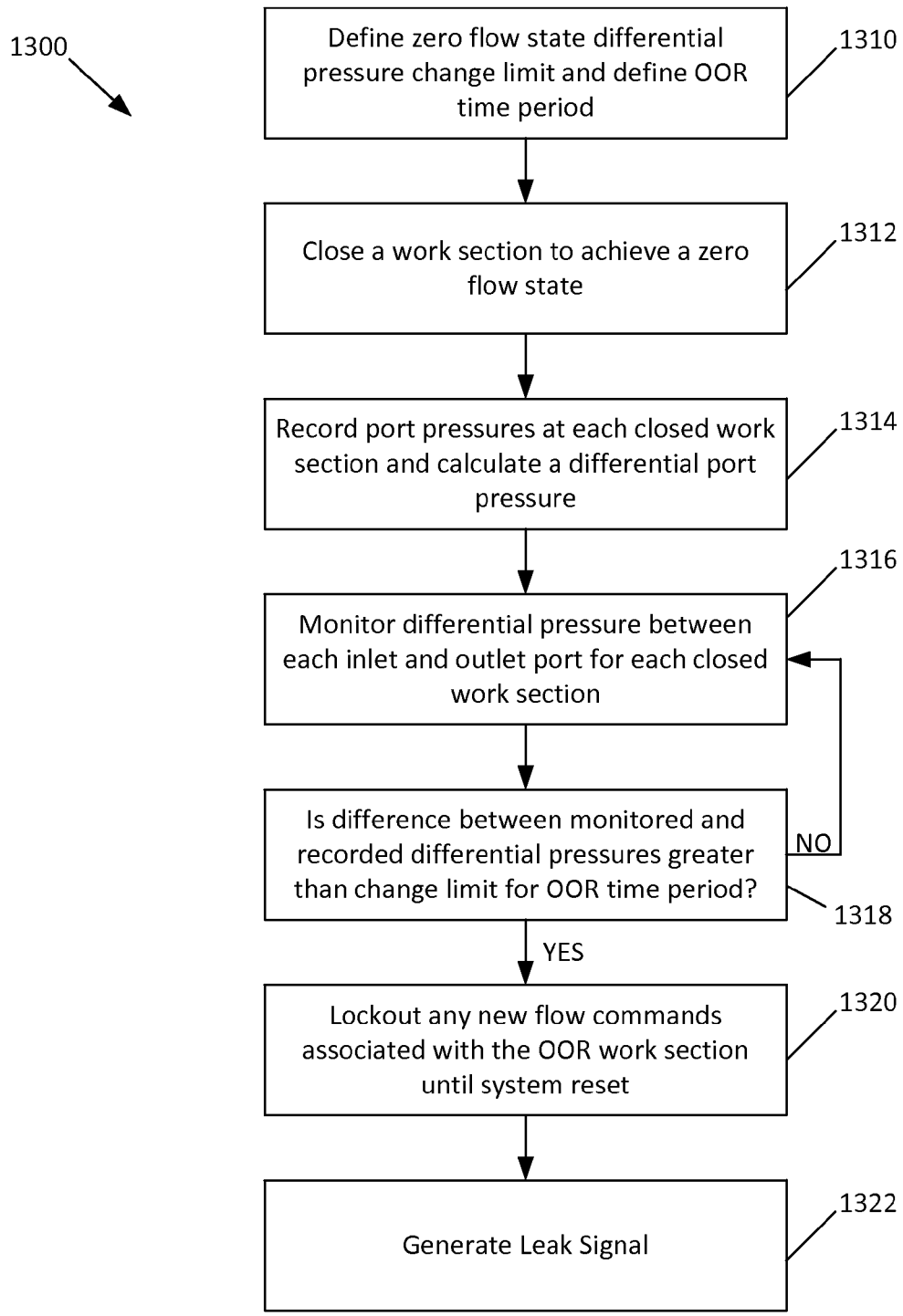
FIG. 6 is a process flow chart showing a third leak detection and isolation protocol for use in the process shown in FIG. 3.

Referring to FIG. 6, a third leak detection protocol 1300 is disclosed. The third leak detection protocol 1300 is for detecting a leak in the hydraulic system between the control valve assembly and one or more of the connected work circuits when the work circuit is in a zero flow state. In a step 1310, a zero flow state differential pressure change limit is defined, as is an out of range time period. In a step 1312, a work section is closed to achieve a zero flow state. In a step 1314, port pressures at each closed work section are recorded and a differential pressure between the inlet and outlet of each work section is calculated. In the embodiment shown, controller 150 monitors pressure sensors 122a, 124a, 132a, 134a, 142a, and 144a for this purpose. In a step 1316, the differential pressure between each inlet and outlet port for each work section is monitored. Where the difference between the monitored and recorded differential pressures is less than or equal to the change limit, the protocol returns to step 1316 for continued monitoring. Where the difference between the monitored and recorded differential pressures is equal to or greater than the change limit for the out of range time period, the protocol proceeds to step 1320. At step 1320, the out of range work section is set to a zero flow condition and locked out from receiving any new flow commands until system reset while step 1322 includes the generation of a leak detection signal. Similar to leak detection protocol 1200, protocol 1300 allows the hydraulic system to at least be partially operative by isolating only those work sections for which a leak is detected. Accordingly, protocol 1300 will continually monitor all active work sections even if a leak signal has been generated for one or more of the other work sections. It is noted that steps 1320 and 1322 may be performed simultaneously by the controller(s) 150, 160, or in a sequential fashion.

Figure 7:
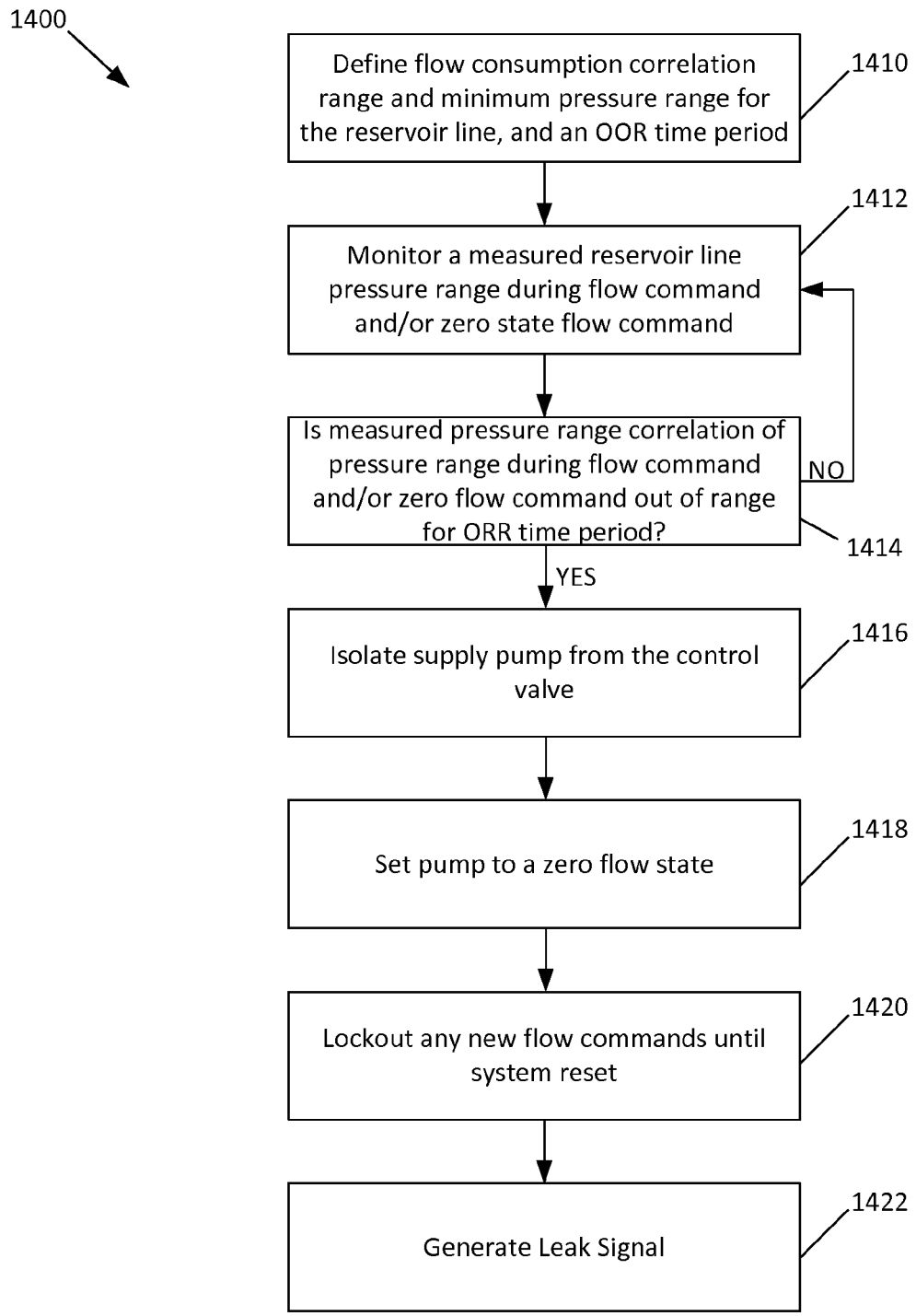
FIG. 7 is a process flow chart showing a fourth leak detection and isolation protocol for use in the process shown in FIG. 4.

Referring to FIG. 7, a fourth leak detection protocol 1400 is shown. Fourth leak detection protocol 1400 is for detecting a leak in the reservoir line between the control valve assembly and the reservoir. In a step 1410 of protocol 1400 a flow consumption correlation range and minimum pressure range for the reservoir line are defined, as is an out of range time period. In a step 1412, the reservoir line pressure range is monitored when there is a flow command or a zero flow state. As the check valve 26 provides a back pressure to the reservoir line, a minimum pressure in the line, for example at pressure sensor 118, would normally be anticipated. Where the pressure falls below the nominal back pressure required by the check valve 26, a leak can be expected to have occurred. Additionally, during a flow state, the correlation between the supply flow and the return flow can be monitored against a calculated correlation range to ensure that a leak also has not occurred. These comparisons are shown at step 1414, where the protocol 1400 returns to step 1412 for continued monitoring if the measured state is within the correlation range and above the minimum pressure range. Where the monitored and measured values are outside of the set ranges for the out of range time period, a leak in the reservoir line is detected and the pump is isolated from the control valve assembly at a step 1416 in a manner similar to that described for step 1116 the first leak detection protocol 1100. In a step 1418, the pump is set to a zero flow state while in a step 1420 any new flow commands to the pump from controllers 150, 160 are locked out until a system reset has occurred. In a step 1422, a leak signal is generated. It is noted that steps 1416, 1418, 1420, and 1422 may be performed simultaneously by the controller(s) 150, 160, or in a sequential fashion.

Where a hydraulic system is configured to implement all four of the leak detection protocols 1100 to 1400, the system can be protected from a leak in the main supply line between the pump and the control valve assembly, from a leak in the reservoir return line between the reservoir and the control valve assembly, and from a leak in any of the individual work circuits regardless of whether the work circuits are being used or not. Furthermore, the system can be configured to isolate the leak in the system once detected in a very small amount of time, for example a few milliseconds, thus minimizing any oil spill. Additionally, the controller 150 and/or 160 can be configured to take into account differences in cylinder ratios and inefficiencies in the actuators such that the leak detection protocols are optimized. Accordingly, the disclosed system will operate to significantly limit the volume of leaked hydraulic fluid should a leak in the system occur.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for detecting and isolating a leak in a hydraulic system having a supply pump serving at least one control valve having plurality of work sections, the method comprising the steps of:
    (a) activating the hydraulic system;
    (b) receiving an actuation command for at least one of the work sections;
    (c) generating a flow demand for the work sections for which an actuation command has been received;
    (d) implementing at least two of a first, second, and third leak detection and isolation protocols;
    (e) the first leak detection and isolation protocol comprising the steps of:
        i. monitoring a measured pump supply pressure;
        ii. comparing the measured pump supply pressure to a pump supply pressure lower limit;
        iii. generating a hydraulic system leak signal to isolate the control valve from the supply pump and to set the pump to a zero flow state when the measured pump supply pressure falls below the pump supply pressure lower limit;
    (f) the second leak detection and isolation protocol comprising the steps of:
        i. monitoring a measured flow consumption at an input and an output port for each of the hydraulic work sections;
        ii. correlating the input flow consumption to the output flow consumption to create a monitored flow consumption correlation;
        iii. comparing the monitored flow consumption correlation to a flow consumption correlation limit;
        iv. generating a hydraulic system leak signal to set a zero flow demand signal to any work section having a monitored flow consumption correlation exceeding the flow consumption correlation limit for the work section;
    (g) the third leak detection and isolation protocol comprising the steps of:
        i. setting one or more work sections to a zero flow state and recording a differential pressure between a measured inlet and a measured outlet pressure;
        ii. monitoring the inlet and outlet pressure for each of the work sections and calculating a monitored differential pressure;
        iii. comparing the difference between the recorded differential pressure and the monitored differential pressure to a differential pressure change limit value;
        iv. generating a hydraulic system leak signal to set a zero flow demand signal to each work section having a monitored differential pressure that exceeds the recorded differential pressure by more than the change limit value.

2. The method of claim 1, wherein the step of implementing at least one of a first, second, and third leak detection and isolation protocol includes implementing the first and second leak detection and isolation protocols.

3. The method of claim 1, wherein the step of implementing at least one of a first, second, and third leak detection and isolation protocol includes implementing the first and third leak detection and isolation protocols.

4. The method of claim 1, wherein the step of implementing at least one of a first, second, and third leak detection and isolation protocol includes implementing the second and third leak detection and isolation protocols.

5. The method of claim 1, wherein the step of implementing at least one of a first, second, and third leak detection protocol includes implementing the first, second, and third leak detection and isolation protocols.

6. The method of claim 5, wherein the step of isolating the control valve from the supply pump includes closing a main pump shut off valve.

7. The method of claim 5, wherein the step of isolating the control valve from the supply pump includes opening a pump bypass valve.

8. The method of claim 5, wherein a hydraulic leak signal is generated when the monitored flow consumption correlation for the work section exceeds the flow consumption correlation limit for a predetermined period of time.

9. The method of claim 5, wherein a hydraulic leak signal is generated when the monitored differential pressure exceeds the recorded differential pressure by more than the change limit value for a predetermined period of time.

10. The method of claim 1, wherein the at least one control valve has at least three work sections.

11. The method of claim 1, wherein the pump is a variable displacement pump.

12. The method of claim 11, wherein the at least one control valve is configured to control the pump.

13. The method of claim 1, wherein the hydraulic system further includes at least one controller having a non-transitory computer-readable storage medium comprising instructions that, when executed by a control unit of an electronic computing system, causes the control unit to execute the method of claim 1.

14. A non-transitory computer-readable storage medium comprising instructions that, when executed by a control unit of an electronic computing system, causes the control unit to execute a method for detecting and isolating a leak in a hydraulic system having a supply pump serving at least one control valve having plurality of work sections, the method comprising the steps of:
    (a) activating the hydraulic system;
    (b) receiving an actuation command for at least one of the work sections;
    (c) generating a flow demand for the work sections for which an actuation command has been received;
    (d) implementing at least two of a first, second, and third leak detection and isolation protocols;
    (e) the first leak detection and isolation protocol comprising the steps of:
        i. monitoring a measured pump supply pressure;
        ii. comparing the measured pump supply pressure to a pump supply pressure lower limit;
        iii. generating a hydraulic system leak signal to isolate the supply pump from the control valve and to set the pump to a zero flow state when the measured pump supply pressure falls below the pump supply pressure lower limit;

(f) the second leak detection and isolation protocol comprising the steps of:
  i. monitoring a measured flow consumption at an input and an output port for each of the hydraulic work sections;
  ii. correlating the input flow consumption to the output flow consumption to create a monitored flow consumption correlation;
  iii. comparing the monitored flow consumption correlation to a flow consumption correlation limit;
  iv. generating a hydraulic system leak signal to set a zero flow demand signal to any work section having a monitored flow consumption correlation exceeding the flow consumption correlation limit for the work section;

(g) the third leak detection and isolation protocol comprising the steps of:
  i. setting one or more work sections to a zero flow state and recording a differential pressure between a measured inlet and a measured outlet pressure;
  ii. monitoring the inlet and outlet pressure for each of the work sections and calculating a monitored differential pressure;
  iii. comparing the difference between the recorded differential pressure and the monitored differential pressure to a differential pressure change limit value;
  iv. generating a hydraulic system leak signal to set a zero flow demand signal to each work section having a monitored differential pressure that exceeds the recorded differential pressure by more than the change limit value.

15. The non-transitory computer-readable storage medium claim 14, wherein the step of implementing at least one of a first, second, and third leak detection and isolation protocol includes implementing the first and second leak detection and isolation protocols.

16. The non-transitory computer-readable storage medium of claim 14, wherein the step of implementing at least one of a first, second, and third leak detection and isolation protocol includes implementing the first and third leak detection and isolation protocols.

17. The non-transitory computer-readable storage medium of claim 14, wherein the step of implementing at least one of a first, second, and third leak detection and isolation protocol includes implementing the second and third leak detection and isolation protocols.

18. The non-transitory computer-readable storage medium of claim 14, wherein the step of implementing at least one of a first, second, and third leak detection and isolation protocol includes implementing the first, second, and third leak detection and isolation protocols.

19. The non-transitory computer-readable storage medium of claim 18, wherein the step of isolating the control valve from the supply pump includes closing a main pump shut off valve.

20. The non-transitory computer-readable storage medium of claim 18, wherein the step of isolating the control valve from the supply pump includes opening a pump bypass valve.

* * * * *